(12) United States Patent
Pagilagan

(10) Patent No.: US 7,057,008 B2
(45) Date of Patent: Jun. 6, 2006

(54) PACKAGING AND CONTAINERS MADE OF WATER-SOLUBLE POLYAMIDES AND PROCESSES FOR THEIR MANUFACTURE

(75) Inventor: Rolando Umali Pagilagan, Parkersburg, WV (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 24 days.

(21) Appl. No.: 10/437,614

(22) Filed: May 14, 2003

(65) Prior Publication Data

US 2003/0232159 A1 Dec. 18, 2003

Related U.S. Application Data

(60) Provisional application No. 60/380,380, filed on May 14, 2002.

(51) Int. Cl.
*C08G 69/26* (2006.01)
*B65D 1/00* (2006.01)
*B29D 22/00* (2006.01)

(52) U.S. Cl. ............... 528/310; 528/332; 528/335; 528/336; 528/339; 528/339.3; 528/340; 528/347; 525/425; 428/34.1; 428/35.2; 428/35.4; 428/35.7; 428/220; 428/474.4

(58) Field of Classification Search ............... 528/310, 528/339, 338, 335, 336, 339.3, 340, 347; 428/35.4, 35.1, 35.2, 220, 474.4
See application file for complete search history.

(56) References Cited

U.S. PATENT DOCUMENTS

| 3,882,090 | A | | 5/1975 | Fagerburg |
| 4,229,567 | A | * | 10/1980 | Sharkey ............... 528/338 |
| 4,273,898 | A | * | 6/1981 | Kohn et al. ............ 525/432 |
| 4,438,010 | A | * | 3/1984 | Lindauer et al. ....... 510/143 |
| 4,735,746 | A | | 4/1988 | Speranza |
| 4,842,761 | A | * | 6/1989 | Rutherford ............ 510/297 |
| 5,030,710 | A | * | 7/1991 | Speranza et al. ....... 528/324 |
| 5,324,812 | A | | 6/1994 | Speranza |
| 5,663,286 | A | * | 9/1997 | Ahmed et al. .......... 528/339 |
| 5,863,979 | A | | 1/1999 | Ahmed |
| 5,866,675 | A | | 2/1999 | Ahmed |
| 5,869,596 | A | * | 2/1999 | Ahmed et al. .......... 528/339 |
| 6,103,809 | A | | 8/2000 | Ahmed |
| 6,228,833 | B1 | * | 5/2001 | Paatz et al. ............ 510/444 |
| 6,630,438 | B1 | * | 10/2003 | Arnau et al. ........... 510/439 |
| 6,846,794 | B1 | * | 1/2005 | Ingram et al. .......... 510/446 |
| 6,897,193 | B1 | * | 5/2005 | Kischkel et al. ........ 510/475 |
| 2003/0008085 | A1 | * | 1/2003 | Davenet et al. ......... 428/35.4 |

FOREIGN PATENT DOCUMENTS

| EP | 457 600 A2 | 11/1991 |
| EP | 773 315 A1 | 11/1995 |

\* cited by examiner

*Primary Examiner*—P. Hampton Hightower

(57) ABSTRACT

Packaging materials made from water-soluble nylons are disclosed, that readily contain materials such as caustic chemicals and upon exposure to water dissolve to provide for the release of the chemical into an aqueous environment. The materials are made from select polyether diamines and select aliphatic dicarboxylic acids.

18 Claims, No Drawings

PACKAGING AND CONTAINERS MADE OF WATER-SOLUBLE POLYAMIDES AND PROCESSES FOR THEIR MANUFACTURE

CROSS REFERENCE TO RELATED APPLICATIONS

This application claims the benefit of U.S. Provisional Application No. 60/380,380, filed May 14, 2002

FIELD OF THE INVENTION

This invention relates to packaging made from water-soluble nylon compositions and suitable for containing materials of interest. More particularly, this invention relates to such packaging that adequately contains the material until deposited into water, after which the material is released into an aqueous environment, and processes for the manufacture thereof.

BACKGROUND OF THE INVENTION

Stringent environmental regulations on chemical emissions and concern for worker exposure to chemicals have intensified the effort to eliminate emissions and minimize physical contact with sensitive materials. There is also a similar desire to limit exposure of consumers to aggressive and corrosive chemicals from a public health perspective. One approach to minimize this exposure during handling of chemicals is the use of pre-packaged unit doses using water-soluble packaging materials. Applications for unit dose packaging are convenient and limit the exposure of the user to different types of chemicals (such as laundry, dishwater or other detergents, pesticides, agriculture chemicals, bleaches, and the like). Presently, partially hydrolyzed polyvinylalcohol (PVA) is used for a number of these applications. However, PVA has limited chemical resistance and thermal stability and is not amenable to film formation by melt extrusion processes such as film casting from melt or blown film extrusion. A combination of moisture and elevated temperatures or the presence of acids and bases can catalyze the hydrolysis of the acetate groups which results in reduced solubility in cold water. For the same reason PVA also has poor shelf life and its solubility in water is adversely affected by storage time and conditions. There is a need for a polymeric composition that is consistently water-soluble to suit these applications.

Water-soluble polymers are either natural (biopolymers) or man-made. To be water-soluble these polymers are highly polar in nature. A large number of functional groups are used to impart polarity and, in turn, water-solubility to various polymers. Functional groups such as amines, hydroxyl, sulfonic acids, and carboxylic acids and their salts are commonly used to solubilize polymers. However, it is not uncommon for the reactive functional groups such as acids and amines to react with other acids and bases that they come in contact with during end-use, and this leads to changes in properties such as solubility. For an extensive review of this subject see "Water-Soluble Polymers", Encyclopedia of Polymer Science & Engineering, Volume 17, pages 730–784, Second Edition, John Wiley & Sons (1989).

There is a long-felt need in the field for the development of a polyamide-based composition for such applications. Nylons are well known for their strength, toughness, abrasion resistance, lubricity, and chemical resistance. The use of nylons in basic packaging applications is widespread because of the aforementioned properties. See generally, Kohan, M. I., "Nylon Plastics Handbook", Hanser/Gardner Publications, Inc., 1995, pages 514, 540, & 568–569. However their adaptation towards applications requiring solubility in water to date has not been particularly effective.

The patent literature includes various teachings regarding water-soluble nylons. U.S. Pat. No. 4,895,660 describes water-soluble sulfonated aromatic polyamides and polyureas that are cross-linked ionically with multi-valent metals for membranes, coatings, and adhesives. Japanese Patent Application 56-93704 describes a photosensitive composition comprising a water-soluble polyamide containing sodium sulfonate groups, a polymerizable unsaturated compound, and a sensitizer for printing plate applications. Japanese Patent Application 98007903A claims the use of alcohol-water solutions of nylons commonly known as PA66, PA46, PA6, and PA12 with a water-soluble methoxymethylated nylon, and thiocyanate salts in alcohol-water solvent as wiper blade coatings to improve performance and durability of the blades. U.S. Pat. Nos. 4,323,639 and 5,688,632 are both directed to water-soluble copolyamides containing polyether segments of 150 to 1500 molecular weight. These polyether-amide segments are obtained from polyether diamines and aliphatic dicarboxylic acids. These water-soluble polyamides are used in conjunction with photopolymerizable compound and a photoinitiator for printing plate applications.

It is well known in organic chemistry that ethers are relatively chemically unreactive compared to functionalities such as acids, amines, and hydroxyls. A water-soluble polyamide containing polyoxyethylene segments for water solubility would possess chemical inertness and thermal stability. These two characteristics would be advantageous in shaped-article production such as extrusion, blow-molding, and injection molding operations. However, up to now there has been no report in the literature on the use of water-soluble nylons containing polyoxyethylene segments for packaging and container applications and as a polymeric binder for tablets and briquettes.

It is an object of the present invention to provide a water-soluble nylon that can be incorporated into unit-dose packaging applications containing any of a variety of materials. It is a further object of the present invention to provide such materials that retain their integrity under ambient conditions and when immersed in water predictably solubilize and thereby release the contained material into aqueous solution. A feature of the present invention is its utility both as a packaging material (as envelopes, pouches and the like) and as a binder (for tablets, briquettes and the like). It is an advantage of the present invention that chemicals suitably packaged with materials described herein are not placed in contact with or only minimally contact persons handling the packaging. A further advantage of the present invention is its suitability for any of a number of conventional molding applications, including blow molding. These and other objects, features and advantages of the present invention will become better understood upon having reference to the description of the invention herein.

SUMMARY OF THE INVENTION

There is disclosed and claimed herein a packaging material comprising a water-soluble polyamide with a solubility in water at 23 C of at least 1.0 weight percent and derived from the reaction of adipic acid and ether diamines with a molecular weight of 148 to 396 and represented by the general formulas

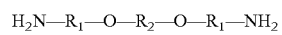

wherein $R_1$ and $R_2$ are either —$CH_2$—$CH_2$— or —$CH_2$—$CH_2$—$CH_2$—;

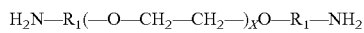

wherein $R_1$ is either —$CH_2$—$CH_2$— or —$CH_2$—$CH_2$—$CH_2$— and X has an average value of 2 to 6; and mixtures thereof.

Those of skill in the art will appreciate that $R_1$'s in the above formula are usually the same but can be different.

Moreover, the packaging materials disclosed and claimed herein and described in the processes also disclosed and claimed herein preferably have water soluble polyamides with a relative viscosity of less than 50 (and most preferably between 10 and 35). The solubility in water of such polyamides is at a rate such that a 5–10 mil film formed of this material will dissolve preferably in less than an hour (and preferably in less than 30 minutes).

DETAILED DESCRIPTION OF THE INVENTION

Copolyamides of the above polyamide with other polyamide-forming comonomers can also be used herein. These other nylon forming comonomers may be incorporated provided these comonomers do not adversely affect the water solubility of the resulting polyamide. These added comonomers may include other polyamide forming comonomers such as lactams, polyether diamines, polyether diacids, alkylene diamines, and alkylene dicarboxylic acids. The solubility in water of these nylons is influenced not only by the amount of the polyetherdiamines and the nature of the dicarboxylic acids but the molecular weight as well. Additives such as heat and UV stabilizers, anti-oxidants, plasticizers, lubricants, and catalyst may be used if desired to enhance the properties of the polymer or aid the polymerization process. Those having skill in the art to which this invention pertains will readily appreciate how much and in what manner these additives may be incorporated.

The water-soluble packaging articles disclosed herein may be fashioned in any of a variety of forms including without limitation films, bags, pouches, bottles, and jars, and as a binder for water-soluble tablets and briquettes and similar applications. In the latter application, the binder on exposure to water disintegrates, thereby providing for a release of the previously bound material into water.

There is also disclosed and claimed herein processes for the manufacture of these various packaging materials. The polyamide described above is formed as a film. The film is then shaped into a container suitable for placement of the chemical or other material of interest to be contained. Once the material is deposited into the container, the container is sealed to retain the material within it. Those having skill in this field will readily appreciate the various techniques for film formation, and container shaping and sealing.

Another process disclosed and claimed herein pertains to the manufacture and use of these polyamides as binders for tablets, briquettes and the like. The material to be packaged is presented, after which the polyamide is interspersed therewithin. The resulting product is shaped into a solid formation of interest. Formative techniques for the tablets and briquettes are again well understood by those having skill in this field, and generally include the initial development of a paste or slurry and subsequently removing the water and/or applying pressure to provide a solidified material. Prior to solidification the material can be shaped in designs and configurations of interest.

EXAMPLES

Preparation of the Nylon Resins

The nylon polymerization was carried out using standard nylon polymerization process that is well-known in the art (See Kohan, M. I., "Nylon Plastics Handbook" Hansen/Gardner Publications, Inc. [1995] pages 17–20 & 34–45). As is well known in the art, the stoichiometry of the ingredients was determined and controlled using pH measurements. The molecular weight during polymerization, as indicated by relative viscosity (RV), was controlled by controlling pH, use of atmospheric, nitrogen, or vacuum finishing after pressure reduction. Usually, the molten polymer is quenched in water and then cut into pellets. However, because these nylons are water-soluble the molten polymer is either allowed to cool under ambient conditions or dropped onto a bed of ground dry ice for cooling.

Testing

The relative viscosity in formic acid (RV) of an 8.4% solution was determined at 25 C using a Brookfield Viscometer.

The solubility in room temperature water (22 C) at 10% concentration was determined by mixing 10 weight percent of the polymer with 90 weight percent demineralized water and stirring at room temperature. The solution was allowed to sit at room temperature and the solution was observed for any sign of precipitation.

Comparative Example A

In a beaker provided with a stirrer, 300 ml. of demineralized water and 222.0 g of triethyleneglycol diamine ($H_2N$—$CH_2$—$CH_2$—O—$CH_2$—$CH_2$—O—$CH_2$—$CH_2$—$NH_2$) were mixed and heated to 60–70 C with stirring. To the mixture was added slowly 345.0 g dodecanedioic acid. An additional 200 ml of de-mineralized water was added. When all the dodecanedioic acid was dissolved the pH was adjusted to 7.15 by addition of 4.1 g of triethyleneglycol diamine (TEGD). The solution was then introduced into a 3,785 ml autoclave where the solution was heated slowly until the pressure in the autoclave reached 250 psig. At this point, steam was slowly vented while heating was continued. When the batch temperature reached 225 C, the steam venting was increased so as to lower the pressure to atmospheric pressure in 45 minutes but at a rate such that the batch temperature would continue to increase as it was being concentrated. The polymer was then subjected to 21.0" of vacuum for 60 minutes. At the end of 60 minutes the batch temperature was 270 C. The autoclave was then pressured with nitrogen and forced out of the autoclave and into a pan. The polymer was allowed to cool to room temperature. The polymer had an RV of 15.7.

Using the same procedure (but with minor variations in temperature, vacuum and hold time as appropriate by those of skill in the art, to obtain the desired molecular weight) as Comparative Example A, Comparative Examples B and C were prepared using the appropriate ingredients. Results are shown below.

| SAMPLE | COMPOSITION | CATALYST | RV | SOLUBILITY |
|---|---|---|---|---|
| Comparative Example C | TEGD, 9 | None | 14.9 | Insoluble |

-continued

| SAMPLE | COMPOSITION | CATALYST | RV | SOLUBILITY |
|---|---|---|---|---|
| Comparative Example B | TEGD, 10 | None | 13.3 | Insoluble |
| Comparative Example A | TEGD, 12 | None | 15.7 | Insoluble |

Example 1

In a beaker provided with a stirrer, 300 ml. of de-mineralized water and 444.0 g of TEGD were mixed and heated to 60–70 C with stirring. To the mixture was added slowly 438.0 g of adipic acid. An additional 100 ml of de-mineralized water was added. When all the adipic acid was dissolved the pH was adjusted to 7.25 by addition of 7.2 g of TEGD. The solution was then introduced into a 3,785 ml autoclave where the solution was heated slowly until the pressure in the autoclave reached 250 psig. At this point, steam was slowly vented while heating was continued. When the batch temperature reached 225 C, the steam venting was increased so as to lower the pressure to atmospheric pressure in 45 minutes but at rate such that the batch temperature would continue to increase as it was being concentrated. The polymer was then subjected to 19.5" of vacuum for 60 minutes. At the end of 60 minutes the batch temperature was 270 C. The autoclave was then pressured with nitrogen and forced out of the autoclave and into a pan. The polymer was allowed to cool to room temperature. The polymer had an RV of 12.9.

Example 2

In a beaker provided with a stirrer, 1997.0 g of de-mineralized water and 740.0 g of TEGD were mixed with stirring. To the mixture was added slowly 730.0 g of adipic acid. When all the adipic acid was dissolved 0.37 g of sodium hypophosphite monohydrate (SHP monohydrate) was added. The pH of the salt solution was 7.10. An 830.0 g portion of the salt was then introduced into a 3,785 ml autoclave where the solution was heated slowly until the pressure in the autoclave reached 250 psig. At this point, steam was slowly vented while heating was continued. When the batch temperature reached 225 C, the steam venting was increased so as to lower the pressure to atmospheric pressure in 45 minutes but at a rate such that the batch temperature would continue to increase as it was being concentrated. The polymer was then held at atmospheric conditions for 20 minutes. At the end of 20 minutes the batch temperature was 255 C. The autoclave was then pressured with nitrogen and forced out of the autoclave and into a pan with ground dry ice. The polymer had an RV of 14.0.

Example 3 and Example 4 were prepared under the same procedure as Example 2 with the exception that vacuum was used for the finishing step. The results are shown below.

| SAMPLE | COMPOSITION | CATALYST (1) | RV | SOLUBILITY |
|---|---|---|---|---|
| Example 1 | TEGD, 6 | None | 12.9 | Soluble |
| Example 2 | TEGD, 6 | 210 ppm | 14.0 | Soluble |
| Example 3 | TEGD, 6 | 349 ppm | 20.5 | Soluble |
| Example 4 | TEGD, 6 | 210 ppm | 22.8 | Soluble |

(1) Sodium hypophosphite monohydrate

Examples 1 to 4 and Comparative Examples A, B, and C demonstrate that the incorporation of ether amine segments in the polymer alone is not sufficient to achieve water solubility. The proper selection of the dicarboxylic acid structure is necessary to obtain water soluble nylons.

Example 5

In a beaker provided with a stirrer, 300 ml of de-mineralized water and 278.2 g of TEGD were mixed and heated to 60–70 C with stirring. To the mixture was added slowly 274.5 g of adipic acid. When the adipic acid has dissolved, 269.0 g of caprolactam solution with an 81.86 weight percent concentration was added. The pH was then adjusted to 7.35 by addition of 4.1 g of TEGD. The solution was then introduced into a 3,785 ml autoclave where the solution was heated slowly until the pressure in the autoclave reached 250 psig. At this point, steam was slowly vented while heating was continued. When the batch temperature reached 225 C, the steam venting was increased so as to lower the pressure to atmospheric pressure in 45 minutes but at a rate such that the batch temperature would continue to increase as it was being concentrated. The polymer was then subjected to 22.0" to 22.5" of vacuum for 60 minutes. At the end of 60 minutes the batch temperature was 268 C. The autoclave was then pressured with nitrogen and forced out of the autoclave and into a pan. The polymer was allowed to cool to room temperature. The polymer had an RV of 17.7. The results are shown below.

| SAMPLE | COMPOSITION | MOLE RATIO | CATALYST (1) | RV | SOLUBILITY |
|---|---|---|---|---|---|
| Example 5 | TEGD, 6/6 | 50/50 | None | 17.7 | Soluble |
| Example 6 | TEGD, 6/6 | 50/50 | 349 ppm | 25.6 | Soluble (2) |
| Example 7 | TEGD, 6/6 | 70/30 | None | 15.3 | Soluble |
| Example 8 | TEGD, 6/6 | 80/20 | None | 14.1 | Soluble |
| Comparative Example D | TEGD, 6/6 | 40/60 | None | 19.0 | Insoluble |

(1) Sodium hypophosphite monohydrate
(2) Soluble but went to solution much slower than Example 5

Examples 5, 6, 7, 8, and Comparative Example D illustrate that the ratio of comonomers affect the solubility of the copolymers in water. Example 5 and Example 6 also demonstrate that the RV (molecular weight) of the polymer also affects the rate of solution. The higher molecular weight results in slower dissolution rate.

Examples 9 to 11 and Comparative Examples E, F, G and H

Using the same procedure as in previous examples, and controlling RV as previously discussed herein various copolymers with nylon 66, 46, and 2-methylpetamethylenediamine, 6 were prepared. The results are shown below.

| SAMPLE | COMPOSITION (1) | MOLE RATIO | CATALYST (2) | RV | SOLUBILITY |
|---|---|---|---|---|---|
| Example 9 | TEGD,6/6,6 | 90/10 | None | 14.1 | Soluble |
| Comparative Example E | TEGD, 6/6, 6 | 80/20 | None | 15.5 | Insoluble |
| Comparative Example F | TEGD, 6/6, 6 | 70/30 | 152 ppm | 16.5 | Insoluble |
| Example 10 | TEGD, 6/2MPMD, 6 | 70/30 | None | 15.1 | Soluble |
| Comparative Example G | TEGD, 6/2MPMD, 6 | 65/35 | None | 17.7 | Insoluble |
| Example 11 | TEGD, 6/4, 6 | 70/30 | None | 9.4 | Soluble |
| Comparative Example H | TEGD, 6/4, 6 | 50/50 | None | 10.5 | Insoluble |

(1) 2MPMD stands for 2-methylpentamethylenediamine
(2) Sodium hypophosphite monohydrate Examples 9, 10, 11, and Comparative Examples E, F, G, and H illustrate again that the solubility in water of copolymers is dependent on the type and amount of comonomer used.

Example 12

In a beaker provided with a stirrer, 500 ml of demineralized water and 264.0 g of 1,2-bis(gamma-aminopropoxy) ethane ($H_2N-CH_2-CH_2-CH_2-O-CH_2-CH_2-O-CH_2-CH_2-CH_2-NH_2$) were mixed and heated to 60–70 C with stirring. To the mixture was added slowly 219.0 g of adipic acid. When the adipic acid has dissolved the pH was adjusted to 7.12 by adding 26.0 g of 1,2-bis(gamma-aminopropoxy) ethane (BGAE) and 5.0 g of adipic acid. . Those having skill in the art will readily appreciate that different grades of BGAE (and as described later, POE-DPA 220) are available, and these have differing levels of monoamines and triamines associated with them. However these byproducts have minor effects in adjusting the pH level so that the pH of interest is readily attained. This may have an effect on the polymerization process, and some adjustments to this process may be necessary to achieve the desirable molecular weight, again as is well appreciated by the person of skill. The solution was then introduced into a 3,785 ml autoclave where the solution was heated slowly until the pressure in the autoclave reached 250 psig. At this point, steam was slowly vented while heating was continued. When the batch temperature reached 225 C, the steam venting was increased so as to lower the pressure to atmospheric pressure in 45 minutes but at a rate such that the batch temperature would continue to increase as it was being concentrated. The polymer was then subjected to 21–22" of vacuum for 60 minutes. At the end of 60 minutes the batch temperature was 258 C. The autoclave was then pressured with nitrogen and forced out of the autoclave and into a pan. The polymer was allowed to cool to room temperature. The polymer had an RV of 7.7.

Example 13

In a beaker provided with a stirrer, 500 ml of de-mineralized water, 246.4 g of BGAE, and 82.0 g of caprolactam solution with an 82.68 weight percent concentration were mixed and heated to 60–70 C with stirring. To the mixture was added slowly 204.4 g of adipic acid. When the adipic acid has dissolved the pH was adjusted to 7.09 by adding 19.5 g of BGAE. The solution was then introduced into a 3,785 ml autoclave where the solution was heated slowly until the pressure in the autoclave reached 250 psig. At this point, steam was slowly vented while heating was continued. When the batch temperature reached 225 C, the steam venting was increased so as to lower the pressure to atmospheric pressure in 45 minutes but at a rate such that the batch temperature would continue to increase as it was being concentrated. The polymer was then subjected to 21" of vacuum for 60 minutes. At the end of 60 minutes the batch temperature was 264 C. The autoclave was then pressured with nitrogen and forced out of the autoclave and into a pan. The polymer was allowed to cool to room temperature. The polymer had an RV of 8.7.

Comparative Example I

In a beaker provided with a stirrer, 500 ml of de-mineralized water, 211.2 g of BGAE, and 164.0 g of caprolactam solution with an 82.68 weight percent concentration were mixed and heated to 60–70 C with stirring. To the mixture was added slowly 175.2 g of adipic acid. When the adipic acid has dissolved the pH was adjusted to 7.15 by adding 12.0 g of BGAE. The solution was then introduced into a 3,785 ml autoclave where the solution was heated slowly until the pressure in the autoclave reached 250 psig. At this point, steam was slowly vented while heating was continued. When the batch temperature reached 225 C, the steam venting was increased so as to lower the pressure to atmospheric pressure in 45 minutes but at a rate such that the batch temperature would continue to increase as it was being concentrated. The polymer was then subjected to 18–19" of vacuum for 60 minutes. At the end of 60 minutes the batch temperature was 264 C. The autoclave was then pressured with nitrogen and forced out of the autoclave and into a pan. The polymer was allowed to cool to room temperature. The polymer had an RV of 10.7. The results are shown below.

| SAMPLE | COMPOSITION (1) | MOLE RATIO | RV | SOLUBILITY |
|---|---|---|---|---|
| Example 12 | BGAE, 6 | | 7.7 | Soluble |
| Example 13 | BGAE, 6/6 | 70/30 | 8.7 | Soluble |
| Comparative Example I | BGAE, 6/6 | 50/50 | 10.7 | Insoluble |

(1) BGAE is an acronym for 1,2-bis(gamma-aminopropoxy) ethane

Examples 12, 13, and Comparative Example I show that replacement of TEGD with BGAE also affords a water-soluble polyamide. Furthermore, copolymers of BGAE,6 behaves similarly with the copolymers of TEGD,6.

Example 14

In a beaker provided with a stirrer, 300 ml of de-mineralized water and 176.0 g of POE-DPA220 were mixed and heated to 60–70 C with stirring. This diprimary amine has the following structure ($H_2N-CH_2-CH_2-CH_2-$[polyoxyethylene]$-CH_2-CH_2-CH_2-NH_2$) where the polyoxyethylene unit is ($O-CH_2-CH_2-O-CH_2-CH_2-O$) and has a molecular weight of 220. To the mixture was added slowly 116.8 g of adipic acid. The pH of the solution was 6.9. To the solution was then added 0.074 g of sodium hypophosphite monohydrate. The salt solution was then introduced into a 3,785 ml autoclave where the solution was heated slowly until the pressure in the autoclave reached 250 psig. At this point, steam was slowly vented while heating was continued. When the batch temperature reached 225 C, the steam venting was increased so as to lower the pressure to atmospheric pressure in 45 minutes but at a rate such that the batch temperature would continue to increase as it was being concentrated. The polymer was then held at atmospheric pressure for 20 minutes. At the end of 20 minutes the batch temperature was 249 C. The autoclave was then pressured with nitrogen and forced out of the autoclave and into a pan of dry ice. The polymer had an RV of 7.8 and was soluble in water at room temperature.

Comparative Example J

In a beaker provided with a stirrer, 200 ml of de-mineralized water and 88.0 g of POE-DPA220 were mixed and heated to 60–70 C with stirring. To the mixture was added slowly 58.4 g of adipic acid. The pH of the solution was adjusted to 6.72 by addition of 5.0 g of POE-DPA220. To the solution were added 117.6 g of a caprolactam solution with a concentration of 74.69 weight percent, 186.8 g of nylon 6,6 salt with a concentration of 31.35 weight percent, and 0.88 g of sodium hypophosphite monohydrate. The salt solution was then introduced into a 3,785 ml autoclave where the solution was heated slowly until the pressure in the autoclave reached 250 psig. At this point, steam was slowly vented while heating was continued. When the batch temperature reached 225 C, the steam venting was increased so as to lower the pressure to atmospheric pressure in 45 minutes but at a rate such that the batch temperature would continue to increase as it was being concentrated. The polymer was then held at atmospheric pressure for 18 minutes. At the end of 18 minutes the batch temperature was 260 C. The autoclave was then pressured with nitrogen and forced out of the autoclave into a pan of dry ice. The polymer had an RV of 12.5.

Using the same procedure as Comparative Example J and controlling RV as previously described herein, Comparative Examples K and L were prepared using POE-DPA514 (molecular weight of 514) and POE-DPA1114 (molecular weight of 1114). The results are shown below.

| SAMPLE | COMPOSITION (1) | SALT WT. RATIO | CATALYST | RV | SOLUBILITY |
|---|---|---|---|---|---|
| Comparative Example J | POE-DPA220, 6/6, 6/6 | 50/20/30 | 0.30 wt. % | 12.5 | Insoluble |
| Comparative Example K | POE-DPA514, 6/6, 6/6 | 50/20/30 | 0.30 wt. % | 15.9 | Insoluble |
| Comparative Example L | POE-DPA1114, 6/6, 6/6 | 50/20/30 | 0.29 wt. % | 16.4 | Insoluble |

Comparative Examples J, K, and L are polymers containing polyether amines and are described in U.S. Pat. Nos. 4,323,639 and 5,688,632 as water-soluble. These comparative examples show that the water-soluble nylon described in the U.S. Pat. Nos. 4,323,639 and 5,688,632 are not water soluble and are not useful for the purposes of this invention.

Examples 15 to 30

The solubility of films in 23 C and 50 C water were determined on compression molded films of TEGD,6 homopolymers and TEGD,6/6 copolymers. A 2"×2" sample of the film was attached to a 2"×2" window cut into an aluminum sheet. This was then immersed in 1000 ml of well-stirred water maintained at 23 C and 50 C. The time it takes for the film sample to start disintegrating and the time it takes to completely dissolve are observed and recorded. Results are shown below:

| SAMPLE | COMPOSITION | MOL RATIO | RV | FILM THICKNESS (mils) | WATER TEMP (C.) | TIME TO DISINTEGRATE (sec) | TIME TO DISSOLVE (sec) | COMMENTS |
|---|---|---|---|---|---|---|---|---|
| Example 15 | TEGD, 6/6 | 50/50 | 19.8 | 4.8 | 50 | 13 | 77 | Solution was clear. |
| Example 16 | TEGD, 6/6 | 50/50 | 15.4 | 5.2 | 50 | 12 | 68 | Solution was clear. |
| Example 17 | TEGD, 6/6 | 50/50 | 25.6 | 5.2 | 50 | 14 | 71 | Solution was clear. |
| Example 18 | TEGD, 6/6 | 50/50 | 15.2 | 4.8 | 50 | 15 | 93 | Solution was clear. |
| Example 19 | TEGD, 6/6 | 76.5/23.5 | 16.0 | 5.3 | 50 | 15 | 65 | Solution was clear. |
| Example 20 | TEGD, 6 | | 12.9 | 5.2 | 50 | 11 | 44 | Solution was clear. |
| Example 21 | TEGD, 6 | | 14.0 | 5.3 | 50 | 18 | 55 | Solution was clear. |
| Example 22 | TEGD, 6 | | 20.5 | 5.1 | 50 | 20 | 63 | Solution was clear. |
| Example 23 | TEGD, 6/6 | 50/50 | 19.8 | 4.9 | 23 | 41 | 121 | Solution was clear. |
| Example 24 | TEGD, 6/6 | 50/50 | 15.4 | 5.8 | 23 | 34 | 109 | Solution was clear. |
| Example 25 | TEGD, 6/6 | 50/50 | 25.6 | 5.2 | 23 | 32 | 196 | Water became cloudy. |
| Example 26 | TEGD, 6/6 | 50/50 | 15.2 | 5.8 | 23 | 32 | 145 | Solution was clear. |
| Example 27 | TEGD, 6/6 | 76.5/23.5 | 16.0 | 4.7 | 23 | 27 | 152 | Solution was clear. |
| Example 28 | TEGD, 6 | | 12.9 | 5.9 | 23 | 40 | 178 | Solution was clear. |
| Example 29 | TEGD, 6 | | 14.0 | 4.5 | 23 | 30 | 143 | Solution was clear. |
| Example 30 | TEGD, 6 | | 20.5 | 5.9 | 23 | 45 | 178 | Solution was clear. |

The results above demonstrate the excellent water solubility of the films. The solubility at 50 C is significantly better than at 22 C. The results of Example 25 on the 50/50 copolymer with the highest RV demonstrate that solubility is adversely affected by increasing molecular weight. This is a confirmation of the results of Example 6.

Examples 31 to 48

The various polymers in Examples 31 to 48 were prepared using the same procedures already illustrated in Examples 1 to 14 and Comparative Examples A to L but with minor variations in temperature, vacuum and hold time as explained earlier. Films of these polymers were then prepared and their solubility in water were determined as in Examples 15 to 30. The results are tabulated below:

| | COMPOSITION | MOLE RATIO | RV | FILM THICKNESS (mils) | WATER TEMP (C.) | TIME TO DISINTEGRATE (sec) | TIME TO DISSOLVE (sec) | COMMENTS |
|---|---|---|---|---|---|---|---|---|
| Example 31 | BGAE, 6/TEGD, 6/6 | 40/20/40 | 32.0 | 3.3 | 23 | 21 | 101 | Solution slightly cloudy. |
| Example 32 | BGAE, 6/POE-DPA220, 6/6 | 40/20/40 | 20.8 | 2.6 | 23 | 12 | 59 | Solution slightly cloudy. |
| Example 33 | BGAE, 6/TEGD, 6/6 | 40/20/40 | 20.4 | 5.2 | 23 | 41 | 256 | Solution slightly cloudy. |
| Example 34 | BGAE, 6/TEGD, 6/6 | 55/25/20 | 18.7 | 4.7 | 23 | 38 | 145 | Solution was clear. |
| Example 35 | BGAE, 6/POE-DPA220, 6 | 50/50 | 12.7 | 6.4 | 23 | 50 | 241 | Solution was clear. |
| Example 36 | BGAE, 6/POE-DPA220, 6/TEGD, 6 | 45/40/15 | 13.6 | 5.5 | 23 | 29 | 357 | Solution was clear. |
| Example 37 | BGAE, 6/POE-DPA220, 6/6 | 45/45/10 | 13.5 | 6.0 | 23 | 38 | 401 | Solution was clear. |
| Example 38 | POE-DPA220, 6/TEGD, 6 | 90/10 | 12.8 | 4.4 | 23 | 27 | 82 | Solution was clear. |
| Example 39 | POE-DPA220, 6/BGAE, 6 | 90/10 | 14.9 | 5.1 | 23 | 31 | 111 | Solution was clear. |
| Example 40 | BGAE, 6/TEGD, 6/6 | 40/20/40 | 32.0 | 3.8 | 50 | 8 | 139 | Solution slightly cloudy. |
| Example 41 | BGAE, 6/POE-DPA220, 6/6 | 40/20/40 | 20.8 | 5.7 | 50 | 10 | 95 | Solution slightly cloudy. |
| Example 42 | BGAE, 6/TEGD, 6/6 | 40/20/40 | 20.4 | 4.5 | 50 | 27 | 69 | Solution slightly cloudy. |
| Example 43 | BGAE, 6/TEGD, 6/6 | 55/25/20 | 18.7 | 5.8 | 50 | 22 | 54 | Solution slightly cloudy. |
| Example 44 | BGAE, 6/POE-DPA220, 6 | 50/50 | 12.7 | 5.6 | 50 | 16 | 59 | Solution slightly cloudy. |
| Example 45 | BGAE, 6/POE-DPA220, 6/TEGD,6 | 45/40/15 | 13.6 | 6.7 | 50 | 17 | 109 | Solution slightly cloudy. |
| Example 46 | BGAE, 6/POE-DPA220, 6/6 | 45/45/10 | 13.5 | 6.8 | 50 | 14 | 140 | Solution slightly cloudy. |
| Example 47 | POE-DPA220, 6/TEGD, 6 | 90/10 | 12.8 | 5.4 | 50 | 5 | 32 | Solution slightly cloudy. |
| Example 48 | POE-DPA220, 6/BGAE, 6 | 90/10 | 14.9 | 5.6 | 50 | 13 | 38 | Solution slightly cloudy. |

Examples M to T

Films were prepared and the solubility was determined as in Examples 15 to 30. The results are shown below: "Mostly dissolved" means a breakdown of material as observed, but part of the material did not dissolve.

| SAMPLE | COMPOSITION | MOL RATIO | RV | FILM THICKNESS (mils) | WATER TEMP (C.) | TIME TO DISINTEGRATE (sec) | TIME TO DISSOLVE (hr) |
|---|---|---|---|---|---|---|---|
| Comparative Example M | TEGD, 6/6, 6 | 80/20 | 15.5 | 7 | 23 | 71 | >5 |
| Comparative Example N | TEGD, 12 | | 15.7 | 6.2 | 23 | No change in 3 hr. | No change in 3 hr. |
| Comparative Example O | BGAE, 6/6 | 70/30 | 14.4 | 5.2 | 23 | 94 | >5 |
| Comparative Example P | BGAE, 6 | | 13.8 | 6.1 | 23 | 1190 | >5 |
| Comparative Example Q | TEGD, 6/6, 6 | 80/20 | 15.5 | 5.5 | 50 | 16 | Mostly dissolved in 5.2 hr. |
| Comparative Example R | TEGD, 12 | | 15.7 | 5.9 | 50 | No change in 3 hr. | No change in 3 hr. |
| Comparative Example S | BGAE, 6/6 | 70/30 | 14.4 | 6.2 | 50 | 24 | Mostly dissolved in 4 hrs. Completely dissolved at room temperature |
| Comparative Example T | BGAE, 6 | | 13.8 | 5.8 | 50 | No change in 3 hr. | No change in 3 hr. |

The results above show that solubility alone is not sufficient criterion for packaging applications. The rate of dissolution is much more important for the intended packaging applications.

It will be readily apparent that any number of variations and modifications to the subject matter disclosed herein can be made, and are contemplated as within the scope and purview of the invention herein.

The invention claimed is:

1. A packaging material comprising a water-soluble polyamide copolymer with a solubility in water at 23 C of at least 1.0 weight percent and derived from the reaction of adipic acid and ether diamines with caprolactam and/or one or more alkylene diamines, wherein the ether diamines have a molecular weight of 148 to 396 and are represented by the general formulas

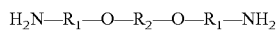

wherein $R_1$ and $R_2$ are either —$CH_2$—$CH_2$— or —$CH_2$—$CH_2$—$CH_2$—;

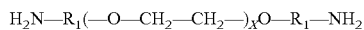

wherein $R_1$ is either —$CH_2$—$CH_2$— or —$CH_2$—$CH_2$—$CH_2$—
and X has an average value of 2 to 6; and mixtures thereof.

2. The packaging material of claim 1 further comprising copolyamides of said water-soluble polyamide and one or more polyamide forming comonomers.

3. The packaging material of claim 1 wherein the water-soluble polyamide is a copolymer with caprolactam.

4. The packaging material of claim 1 in the form of a film, pouch, bag, bottle, or jar.

5. The packaging material of claim 1 as a binder material for water-soluble tablets and briquettes.

6. The packaging material of claim 1 wherein said water soluble polyamide has a relative viscosity of less than 50.

7. The packaging material of claim 6 wherein the relative viscosity of said water soluble polyamide is between 10 and 35.

8. The packaging material of claim 1 wherein the solubility in water of said polyamide is at a rate such that a 5–10 mil film formed therefrom will dissolve in less than one hour.

9. The packaging material of claim 8 wherein the solubility rate is such that a 5–10 mil film will dissolve in less than 30 minutes.

10. A process for the manufacture of water-soluble polyamide packaging materials comprising:
  (i) Forming a water-soluble polyamide copolymer as a film, said polyamide having an RV of less than 50, solubility in water at 22 C of at least 1.0 weight percent and at such a rate that a 5–10 mil film will dissolve in less than an hour, preferably in less than 30 minutes, and derived from the reaction of adipic acid and ether diamines with caprolactam and/or one or more alkylene diamines, wherein the ether diamines have a molecular weight of 148 to 396 and are represented by the general formulas

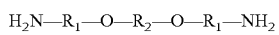

wherein $R_1$ and $R_2$ are either —$CH_2$—$CH_2$— or —$CH_2$—$CH_2$—$CH_2$—;

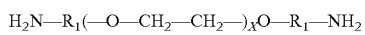

wherein $R_1$ is either —$CH_2$—$CH_2$— or —$CH_2$—$CH_2$—$CH_2$—
and X has an average value of 2 to 6; and mixtures thereof;
  (ii) Shaping said film so formed in step (i) into a container into which a material of interest can be placed;
  (iii) Depositing within said container formed in step (ii) the material of interest; and
  (iv) Sealing said container so that the material of interest is retained therewithin.

11. The process of claim 10 wherein said water soluble polyamide is formed such that it has a relative viscosity of less than 50.

12. The process of claim 11 wherein the relative viscosity of said water soluble polyamide is between 10 and 35.

13. The process of claim 10 wherein said water soluble polyamide has a solubility such that a 5–10 mil film formed therefrom will dissolve in less than one hour.

14. The process of claim 13 wherein the solubility of said water soluble polyamide is such that the 5–10 mil film will dissolve in less than 30 minutes.

15. The process of claim 10 wherein the material retained in the container is laundry or dishwasher detergent.

16. A process for the manufacture of packaging for materials of interest by including water-soluble polyamide interspersed therewithin comprising:
   (i) Presenting the material to be packaged;
   (ii) Interspersing with the material presented in step (i) a water-soluble polyamide copolymer having a solubility in water at 22 C of at least 1.0 weight percent and derived from the reaction of adipic acid and ether diamines with caprolactam and/or one or more alkylene diamines, wherein the ether diamines have a molecular weight of 148 to 396 and are represented by the general formulas

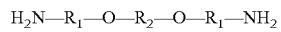

wherein $R_1$ and $R_2$ are either —$CH_2$—$CH_2$— or —$CH_2$—$CH_2$—$CH_2$—;

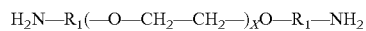

wherein $R_1$ is either —$CH_2$—$CH_2$— or —$CH_2$—$CH_2$—$CH_2$— and X has an average value of 2 to 6; and mixtures thereof; and
   (iii) Shaping the material in step (i) as interspersed with water-soluble polyamide in step (ii) into a solid form.

17. The process of claim 16 wherein the solid form is either a tablet or a briquette.

18. The process of claim 10 wherein the polyamide has an RV of between 10 and 35.

* * * * *